ically cleaned and dehulled soybeans. The raw soybeans are
United States Patent [19]

Mattil et al.

[11] 4,151,310
[45] Apr. 24, 1979

[54] SOYBEAN PROTEIN EXTRACT

[75] Inventors: Karl F. Mattil; Khee C. Rhee, both of Bryan, Tex.; Carl M. Cater, deceased, late of Bryan, Tex., by Betty J. Cater, administratrix

[73] Assignee: The Andersons, Maumee, Ohio

[21] Appl. No.: 804,356

[22] Filed: Jun. 7, 1977

[51] Int. Cl.² ............................................... A23J 1/14
[52] U.S. Cl. .................................. 426/656; 426/431; 426/489; 426/507
[58] Field of Search ............... 426/655, 656, 489, 507, 426/431; 260/112 R, 112.6, 123.5

[56] References Cited

U.S. PATENT DOCUMENTS

| | | | |
|---|---|---|---|
| 2,881,076 | 4/1959 | Sair | 426/656 X |
| 2,928,821 | 3/1960 | Chayen | 426/656 X |
| 3,794,735 | 2/1974 | Newsom et al. | 426/364 |
| 3,865,802 | 2/1975 | Mustakas | 260/123.5 |
| 3,943,266 | 3/1976 | Halik et al. | 426/656 |

*Primary Examiner*—Robert A. Yoncoskie
*Attorney, Agent, or Firm*—Barker, Emch, Schaffer & Todd Co.

[57] ABSTRACT

A recovered soybean protein extract is disclosed containing at least 55 percent of soybean protein, on a dry solids basis, and from 2 to 32 percent of natural soybean oil, based on the weight of the protein. The remainder of the extract includes water, carbohydrates, minerals and proteinate salts. A method for recovering the soybean protein extract, whereby the oil and the protein are jointly separated from the soybean, is also disclosed. The method involves grinding cleaned and dehulled soybeans, slurrying the ground product in peroxide and water, and recovering a protein extract from the slurry by centrifugal processing. An isolate, protein content at least 85 percent, is obtained by adjusting the slurry pH to at least about 8 to solubilize the protein, removing the insolubles and free oil, and then precipitating the protein solids by lowering the pH to about 4.5; the precipitated protein is then recovered from the slurry. The protein and oil content of the extract may be varied through minor modifications to the above steps so as to produce oil-containing extracts having as low as 55 percent protein. Unexpectedly, the protein extract of the instant invention, notwithstanding an oil content of at least 2 percent, has been found to have an extended shelf life.

3 Claims, No Drawings

SOYBEAN PROTEIN EXTRACT

DEFINITIONS

The terms "percent" and "parts" are used herein and in the appended claims to refer to percent and parts by weight, unless otherwise indicated.

BACKGROUND OF THE INVENTION

Conventionally, the first step in processing soybeans has involved the use of organic solvent extraction to remove oil from flakes of cleaned and cracked soybean meats. Hexane is a commonly used solvent for this purpose. The hexane is then separated from the oil and reused, leaving the oil as one of the desired products. Defatted flours and grits are then made from the extracted solids by desolventizing, grinding and screening. Defatted flours and grits are used in animal feeds, and are also the starting materials for further processing into protein concentrates and isolates. The production of protein concentrates has involved slurrying defatted flour in water at a pH of about 4.6, and separating solids and liquid centrifugally. The solids can be reslurried with water and again separated centrifugally. A third slurrying has also been suggested, followed by centrifugal separation, addition of caustics to the solids to bring the pH to 6.5–7.1, heating at 140° F. for about thirty minutes, and then recovering a protein concentrate containing 68 percent protein and 4 percent water by spray drying.

Protein isolate has been produced from defatted soybean flour by slurrying the flour in water, adding caustic to adjust the pH to one in the range of 7–11, separating solids from the aqueous phase centrifugally, adjusting the pH of the aqueous phase to 4.5, recovering solids from the resulting slurry centrifugally, reslurrying the solids, recovering the reslurried solids centrifugally, adding caustic to a pH in the range of 6.5–7.0, and recovering protein isolate containing 92.5 percent protein and 5 percent water by spray drying.

These known ways for processing soybeans are discussed in considerable detail in FCS (Farmer Cooperative Service) Research Report 33, January, 1976. This Research Report is entitled "Edible Soy Protein".

Recently, it has been found that protein and oil can be recovered simultaneously in an aqueous system from raw peanuts and from fresh coconuts. Briefly, the process involves forming an aqueous slurry of the raw peanut or of the fresh coconut meat, separating solids from the slurry, three-phase centrifugation to recover an oil stream, an aqueous stream and solid material, demulsification of the oil, if required, and drying of the recovered protein. The pH of the initial slurry of raw peanuts or fresh coconuts is adjusted either to the alkaline side or to the acid side. At an alkaline pH the protein is dissolved, so that the initial separation of solids, e.g., by screening, removes most of the residue from the slurry, leaving the protein in solution. The protein can then be precipitated by acidifying the liquid phase, separating protein by a screening operation, and then subjecting the remaining liquid to three-phase centrifugation. The protein recovered by screening is then combined with the solids phase from the three-phase centrifugation and dried, constituting a protein isolate.

When the initial aqueous slurry is adjusted to an acid pH, the initial separation of solids removes most of the protein from the slurry, along with other insoluble materials. These solids are ultimately combined with the solids from the three-phase centrifugation, and the combined solids are dried, producing a protein concentrate.

These processes for simultaneous recovery of oil and protein from raw peanuts and fresh coconut are described in recent Journal articles, e.g., Cater et al, *J. Amer. Oil Chem. Soc.* 51:137 (1974); Rhee et al, *J. Food Sci.* 37:90 (1972); and Rhee et al, *J. Food Sci.* 38:126 (1973).

BRIEF DESCRIPTION OF THE INSTANT INVENTION

The instant invention is based upon the discovery that an unexpectedly advantageous protein extract and oil can by jointly recovered from soybeans in an aqueous system. The extract contains at least 55 percent of soybean protein, based on the total dry weight of solids, and from 2 to 32 percent of natural soybean oil based on the weight of the protein. The oil and the protein extract must have been recovered simultaneously from soybeans in an aqueous system. Extracts according to the invention have been found to have extended shelf lives, differing in this respect from oil-containing protein extracts which have previously been made from soybeans using the organic solvent extraction techniques. This is because the aqueous system preferentially extracts out "free oil", leaving behind "bound oil" which is less likely to oxidize and/or become rancid. Organic solvent extraction removes all types of oil without preference, such that partial extraction by such a method always leaves behind a large enough amount of "free oil" of the type which is easily oxidizable. The prior organic solvent extracts become rancid after standing for only a short time under ambient conditions.

DESCRIPTION OF THE PREFERRED EMBODIMENTS

Examples 1–4, below, constitute the best presently known modes for making a protein extract from soybeans, according to the instant invention.

EXAMPLE 1

Cleaned soybeans were preconditioned by heating at 70° C. to a moisture content of 6 percent, in order to facilitate grinding and discourage enzyme action which gives a beany flavor. The soybeans were dehulled by cracking and blowing the hulls away and then fed to a contraplex pin mill to produce a ground product, 99+ percent of which was finer than 70 mesh, U.S. Sieve Series, and 85 percent of which was finer than 100 mesh, U.S. Sieve Series. A finer product would be desirable but is presently prohibited by economics and commercially available grinding equipment.

The ground soybeans were then added to water at a temperature of 60° C. and containing approximately 0.03 percent of hydrogen peroxide. The weight ratio of ground soybeans to water was 1:12. The hydrogen peroxide serves to further inactivate enzyme activity which produces off-flavors.

The slurry was then agitated during the addition of an aqueous solution of sodium hydroxide in an amount sufficient to adjust the pH to 8 to 9, and to maintain it there for approximately 30 minutes. The aqueous slurry was then centrifuged to effect a separation into three phases: an aqueous phase "A", a solids phase "B", and an oil/emulsion phase "C".

The solids phase "B", which contained primarily insolubles but also included some recoverable protein solids and oil, was further treated by adding it to water at a solids-to-water ratio of 1:5. The slurry was agitated for about 30 minutes, adding an aqueous solution of sodium hydroxide when necessary to maintain the pH at 8 to 9. The slurry was then centrifuged into three phases: an aqueous phase "D", a solids phase "E", and an oil/emulsion phase "F". The solids phase "E" is simply a fibrous residue which, after drying, is useful as a livestock feed. The oil/emulsion phases "C" and "F" were then combined and further processed to recover the valuable soybean oil. The aqueous phases "A" and "D", containing soluble protein and bound oil, were then combined and treated as described below to obtain the extract of the present invention.

The combined aqueous phases were adjusted to a pH of 4.5 by adding hydrochloric acid, and the protein solids were thereby precipitated. The slurry was centrifuged into a solids phase "G" and a whey phase "H". The whey phase "H" may be further processed into useable commercial products. The solids phase "G" was then spray-dried to yield a protein isolate. The above procedure was repeated numerous times resulting in protein extracts ranging from 81 to 85 percent protein and 7 to 9 percent oil, based on the total of dry solids.

Samples of the extract were placed in seven different polyvinyl chloride bags which were sealed tightly and stored in the dark for shelf life testing. The shelf life or stability of the extract was determined by peroxide analysis. Since when a soybean fat or oil oxidizes it produces peroxide, which results in objectionable flavor, the peroxide number, in units of milliequivalents of peroxide per 1000 grams of oil, is indicative of fat oxidation or rancidity. It has been found that objectionable flavor is not detected until the peroxide number reaches 4.0. Each of the above bags of soybean extract were opened after a certain number of days and three measurements of peroxide content were made. As a control, three measurements of peroxide content were also made immediately after the extract was spray-dried. The following table presents the average of the three measurements for each day that a sample was analyzed.

| No. of Days since Extraction | 0 | 7 | 14 | 21 | 30 | 60 | 90 | 120 |
|---|---|---|---|---|---|---|---|---|
| Peroxide No. | 0.8 | 0.9 | 0.9 | 1.0 | 1.1 | 1.2 | 1.2 | 1.1 |

EXAMPLE 2

The above procedure in Example 1 was repeated except that the solids phase "G" was further processed to yield a higher purity product. The solids phase was added to a hydrochloric acid/water solution at a pH of 4.5 to resuspend the protein solids and to redissolve unwanted solubles. The slurry was then centrifuged and the solids were separated. This procedure was repeated several times resulting in protein extracts ranging from 88 to 90 percent protein and 4 to 6 percent oil, based on the total weight of dry solids.

EXAMPLE 3

The procedure in Example 1 was repeated except that the solids phase "G" was further processed to yield a higher purity product. The solids phase was added to water at a solids-to-water ratio of 1:6. Then, while agitating, sodium hydroxide was added to the slurry to adjust the pH to 8 to 9 and to dissolve the protein solids. The slurry was centrifuged into an aqueous phase "I" and a solids phase "J". The solids phase "J" constitutes residue which could be discarded or used as livestock feed. Hydrochloric acid was added to the aqueous phase "I" to adjust the pH to 4.5 and to precipitate out the protein. The slurry was centrifuged into a solids phase "K" and whey phase "L". The whey phase "L" may be further processed into commercially useable products. The solids phase "K" was spray-dried to yield a protein isolate. The above procedure was repeated several times resulting in a protein extract having a protein content ranging from 90 to 92 percent and an oil content ranging from 3 to 6 percent, based on the total weight of dry solids.

EXAMPLE 4

Cleaned soybeans were dehulled and then ground by a contraplex pin mill such that 93 percent of the product was finer than 80 mesh, U.S. Sieve Series, and 80 percent was finer than 100 mesh, U.S. Sieve Series.

The ground product was then agitated in an aqueous solution at approximately 65° C. containing 0.015 percent hydrogen peroxide and adjusted to a pH of 8.9. The solids-to-water ratio was 1:12. The slurry was centrifuged into an aqueous phase "A" and residual solids "B". The residual solids "B" constitute a fibrous material which may be dried and used as a livestock feed.

The aqueous phase "A", which includes dissolved protein, oil and whey, was adjusted to a pH of 4.5 by adding hydrochloric acid, thereby precipitating protein. The slurry was then centrifuged into an aqueous phase "C" and a solids phase "D". The aqueous phase "C" was then separated and subsequently centrifuged into three phases: a solids phase "E", a whey phase "F", and an oil/emulsion phase "G". The whey phase "F" and oil/emulsion phase "G" may be further processed to yield useful soybean products.

The solids phases "D" and "E" were combined and spray-dried to yield a protein extract having a protein content of 59.5 percent, based on the total weight of dry solids, and a fat content of 31.3 percent, based on the weight of the protein. The reason for the higher fat content in this example is that solids phase "D", which constituted the bulk of protein extract, was precipitated and then separated from the aqueous slurry prior to removal of the oil/emulsion phase. Thus, some of that oil stayed bound to the solid matter.

In each of the above examples, the protein and fat content of the extract were disclosed. It should be understood, however, that the remainder of the extract consisted essentially of fiber, ash, NFE (Nitrogen Free Extract), and water.

It should also be clear from the foregoing examples that some of the conditions and steps could be slightly modified to yield a continuum of oil-containing protein extracts having a high protein content.

What we claim is:

1. A soybean protein extract containing at least 55 percent of soybean protein, on a dry solids basis, and from 2 to 32 percent of natural soybean oil, based on the weight of the protein, and the remainder of said extract consisting essentially of carbohydrates and minerals, and edible proteinate salts of the protein of said extract, said oil and said protein being further separable from each other by solvent extraction and having been jointly separated from soybeans by the method including the steps of:

(a) dry grinding such soybeans to a ground product finer than 70 mesh, U.S. Sieve Series;
(b) agitating said ground product as a slurry in an alkaline aqueous solution at a pH of at least about 8 for a time sufficient to solubilize protein and to yield aqueous, oil, and insoluble solids phases;
(c) separating said aqueous and oil phases from said insoluble solids phase; and
(d) either first centrifugally separating said aqueous phase from said oil phase and then lowering the pH of said aqueous phase to 4.0–5.0 to precipitate such protein extract, or first lowering the pH of said combined aqueous and oil phases to 4.0–5.0 to precipitate such protein extract and then centrifugally separating out such extract from said oil phase.

2. A soybean protein extract as claimed in claim 1 wherein the oil content is from 2 to 15 percent.

3. A soybean protein extract as claimed in claim 2 wherein the soybean protein content is at least 85 percent.

* * * * *